United States Patent
Marking et al.

(10) Patent No.: US 12,481,729 B2
(45) Date of Patent: *Nov. 25, 2025

(54) SIMPLE NONAUTONOMOUS PEERING MEDIA CLONE DETECTION

(71) Applicant: Warner Bros. Entertainment Inc., Burbank, CA (US)

(72) Inventors: Aaron Marking, Portland, OR (US); Kenneth Goeller, Los Angeles, CA (US); Jeffrey Bruce Lotspiech, Henderson, NV (US)

(73) Assignee: Warner Bros. Entertainment Inc., Burbank, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 18/394,034

(22) Filed: Dec. 22, 2023

(65) Prior Publication Data

US 2024/0143728 A1 May 2, 2024

Related U.S. Application Data

(63) Continuation of application No. 16/989,668, filed on Aug. 10, 2020, now Pat. No. 11,868,170, which is a
(Continued)

(51) Int. Cl.
*G06F 21/10* (2013.01)
*G06F 21/44* (2013.01)
(Continued)

(52) U.S. Cl.
CPC ............. *G06F 21/10* (2013.01); *G06F 21/44* (2013.01); *H04K 1/00* (2013.01); *H04L 63/0428* (2013.01);
(Continued)

(58) Field of Classification Search
None
See application file for complete search history.

(56) References Cited

U.S. PATENT DOCUMENTS

| 4,510,572 A | 4/1985 | Reece et al. |
| 4,577,289 A | 3/1986 | Comerford et al. |

(Continued)

FOREIGN PATENT DOCUMENTS

| EP | 0610623 A1 | 8/1994 |
| EP | 0644474 A1 | 3/1995 |

(Continued)

OTHER PUBLICATIONS

"Of." Webster's Third New International Dictionary, Unabridged, Merriam-Webster, Incorporated, 1993. [online] [retrieved on Apr. 9, 2011]. Retrieved from.
(Continued)

*Primary Examiner* — Farley Abad
*Assistant Examiner* — Dayton Lewis-Taylor
(74) *Attorney, Agent, or Firm* — Bookoff McAndrews, PLLC

(57) ABSTRACT

A playback device includes a port configured to receive content from an external memory device, a device memory residing in the device, and a controller programmed to execute instructions that cause the controller to read a read data pattern from the defined region in the external memory device and determine if the read data pattern correlates to an expected data pattern to a predetermined level, wherein the expected data pattern is derived at least in part from a defect map of the defined region.

18 Claims, 3 Drawing Sheets

Related U.S. Application Data continuation of application No. 12/839,105, filed on Jul. 19, 2010, now Pat. No. 10,740,453.

(60) Provisional application No. 61/226,421, filed on Jul. 17, 2009.

(51) Int. Cl.
| | | |
|---|---|---|
| *H04K 1/00* | (2006.01) | |
| *H04L 9/40* | (2022.01) | |
| *H04L 67/06* | (2022.01) | |
| *H04L 67/104* | (2022.01) | |
| *H04L 67/1074* | (2022.01) | |

(52) U.S. Cl.
CPC ............ *H04L 67/06* (2013.01); *H04L 67/108* (2013.01); *H04L 67/104* (2013.01); *H04L 2209/60* (2013.01)

(56) References Cited

U.S. PATENT DOCUMENTS

| | | |
|---|---|---|
| 5,204,897 A | 4/1993 | Wyman |
| 5,646,923 A | 7/1997 | Shea |
| 5,742,757 A | 4/1998 | Hamadani et al. |
| 5,870,543 A | 2/1999 | Ronning |
| 6,029,259 A | 2/2000 | Sollish et al. |
| 6,092,195 A | 7/2000 | Nguyen |
| 6,141,010 A | 10/2000 | Hoyle |
| 6,161,052 A | 12/2000 | Charlton et al. |
| 6,236,727 B1 | 5/2001 | Ciacelli et al. |
| 6,253,193 B1 | 6/2001 | Ginter et al. |
| 6,289,292 B1 | 9/2001 | Charlton et al. |
| 6,405,323 B1 | 6/2002 | Lin et al. |
| 6,557,125 B1 | 4/2003 | Rochat et al. |
| 6,654,904 B1 | 11/2003 | Andoh et al. |
| 6,701,528 B1 | 3/2004 | Arsenault et al. |
| 6,775,817 B2 | 8/2004 | Ono et al. |
| 6,782,458 B1 | 8/2004 | Noble |
| 6,850,379 B2 | 2/2005 | Andoh et al. |
| 6,862,704 B1 | 3/2005 | Miner |
| 6,944,735 B2 | 9/2005 | Noble |
| 6,961,853 B2 | 11/2005 | Marshall |
| 7,017,044 B1 | 3/2006 | Carpenter et al. |
| 7,058,819 B2 | 6/2006 | Okaue |
| 7,076,468 B2 | 7/2006 | Hillegass et al. |
| 7,089,420 B1 | 8/2006 | Durst et al. |
| 7,092,953 B1 | 8/2006 | Haynes |
| 7,103,574 B1 | 9/2006 | Peinado et al. |
| 7,165,050 B2 | 1/2007 | Marking |
| 7,269,259 B1 | 9/2007 | Fernandez |
| 7,278,165 B2 | 10/2007 | Molaro |
| 7,299,328 B2 | 11/2007 | Noble |
| 7,330,980 B2 | 2/2008 | Nasu |
| 7,334,159 B1* | 2/2008 | Callaghan ............... G11C 29/16 714/6.24 |
| 7,493,494 B2 | 2/2009 | Bondurant |
| 7,496,540 B2 | 2/2009 | Irwin et al. |
| 7,562,270 B2 | 7/2009 | Andoh |
| 7,584,258 B2 | 9/2009 | Maresh et al. |
| 7,594,275 B2 | 9/2009 | Zhu et al. |
| 7,639,849 B2 | 12/2009 | Kimpe et al. |
| 7,949,913 B2 | 5/2011 | Norrod et al. |
| 8,095,988 B2 | 1/2012 | Un et al. |
| 8,724,408 B2 | 5/2014 | Ho et al. |
| 9,213,846 B2 | 12/2015 | Asipov |
| 2001/0016836 A1 | 8/2001 | Boccon-Gibod et al. |
| 2002/0023248 A1 | 2/2002 | Suzuki et al. |
| 2002/0040436 A1 | 4/2002 | Davis et al. |
| 2002/0052053 A1 | 5/2002 | Ono et al. |
| 2002/0122266 A1 | 9/2002 | Andoh et al. |
| 2002/0150251 A1 | 10/2002 | Asano et al. |
| 2002/0199099 A1 | 12/2002 | Shirai et al. |
| 2003/0018895 A1 | 1/2003 | Morrison |
| 2003/0063405 A1 | 4/2003 | Jin et al. |
| 2003/0110503 A1 | 6/2003 | Perkes |
| 2003/0140088 A1 | 7/2003 | Robinson et al. |
| 2003/0145093 A1 | 7/2003 | Oren et al. |
| 2003/0149670 A1 | 8/2003 | Cronce |
| 2003/0163372 A1 | 8/2003 | Kolsy |
| 2003/0187679 A1 | 10/2003 | Odgers et al. |
| 2004/0024688 A1 | 2/2004 | Bi et al. |
| 2004/0091114 A1 | 5/2004 | Carter et al. |
| 2004/0103305 A1 | 5/2004 | Ginter et al. |
| 2004/0139024 A1 | 7/2004 | So |
| 2004/0255079 A1 | 12/2004 | Noble |
| 2005/0010531 A1 | 1/2005 | Kushalnagar et al. |
| 2005/0013589 A1 | 1/2005 | Shah et al. |
| 2005/0050218 A1 | 3/2005 | Sheldon |
| 2005/0060745 A1 | 3/2005 | Riedl et al. |
| 2005/0149687 A1 | 7/2005 | Adelmann |
| 2005/0149759 A1 | 7/2005 | Vishwanath et al. |
| 2005/0177624 A1 | 8/2005 | Oswald et al. |
| 2005/0188214 A1 | 8/2005 | Worley et al. |
| 2005/0216772 A1 | 9/2005 | Noble |
| 2005/0283566 A1* | 12/2005 | Callaghan ............... G06F 21/85 711/163 |
| 2006/0059383 A1 | 3/2006 | Roohparvar |
| 2006/0064383 A1 | 3/2006 | Marking |
| 2006/0064386 A1 | 3/2006 | Marking |
| 2006/0200414 A1 | 9/2006 | Roberts |
| 2006/0262147 A1 | 11/2006 | Kimpe et al. |
| 2007/0124602 A1 | 5/2007 | Wald et al. |
| 2007/0174564 A1 | 7/2007 | Andoh |
| 2007/0180153 A1 | 8/2007 | Cornwell et al. |
| 2007/0233933 A1 | 10/2007 | Wang et al. |
| 2008/0133938 A1 | 6/2008 | Kocher et al. |
| 2009/0013195 A1 | 1/2009 | Ochi et al. |
| 2009/0049257 A1 | 2/2009 | Khatri et al. |
| 2009/0049351 A1 | 2/2009 | Norrod et al. |
| 2009/0158044 A1 | 6/2009 | Kirovski |
| 2009/0204778 A1 | 8/2009 | Marking et al. |
| 2010/0088750 A1 | 4/2010 | Okamoto et al. |
| 2010/0218000 A1 | 8/2010 | Marking et al. |
| 2010/0299458 A1 | 11/2010 | Marking et al. |

FOREIGN PATENT DOCUMENTS

| | | | |
|---|---|---|---|
| EP | 0917132 | A2 | 5/1999 |
| GB | 2342488 | A | 4/2000 |
| JP | S60145501 | A | 8/1985 |
| JP | H07325712 | A | 12/1995 |
| JP | H08129828 | A | 5/1996 |
| JP | H11265545 | A | 9/1999 |
| JP | 2001101083 | A | 4/2001 |
| JP | 2002009754 | A | 1/2002 |
| JP | 2002518784 | A | 6/2002 |
| JP | 2003151209 | A | 5/2003 |
| JP | 2003263371 | A | 9/2003 |
| WO | 9962022 | A1 | 12/1999 |
| WO | 0219589 | A1 | 3/2002 |
| WO | 0229510 | A2 | 4/2002 |
| WO | 2006077850 | A1 | 7/2006 |
| WO | 2010099351 | A1 | 9/2010 |

OTHER PUBLICATIONS

Chinese Office Action dated Mar. 27, 2014 in related Chinese Patent Application No. 201080039520.3.
Chip Repairer Memory Corp Tweaks Its Product Line and Prays for Prices to Start Hardening Again. (1996). Computergram International, (2919). Retrieved on Mar. 25, 2020 from URL: (Year: 1996).
European Search Report dated Jan. 3, 2013, Application No. 09710597.7.
Extended European Search Report (EESR) dated Jul. 29, 2013 for European Patent Application No. 10800679.2.
Final Office Action dated Feb. 25, 2021 for U.S. Appl. No. 14/995,114.
Final Office Action dated Jun. 28, 2022 for U.S. Appl. No. 14/995,114.
Japanese Office Action (with English translation) dated Aug. 20, 2013 for Japanese Patent Application No. 2010-546108.
Japanese Office Action (with English translation) dated Sep. 10, 2013 for Japanese Patent Application No. 2012-520841.

(56) References Cited

OTHER PUBLICATIONS

Japanese Office Action dated Feb. 18, 2014 in related Japanese Patent Application No. 2012-520841.
McNutt, Dinah, and Michael Pearlman. "Where Did All The Bytes Go?." Lisa. 1993. (Year: 1993).
Non-Final Office Action dated Apr. 5, 2019 for U.S. Appl. No. 14/995,114.
Non-Final Office Action dated Dec. 21, 2021 for U.S. Appl. No. 14/995,114.
Notice of Allowance dated Mar. 20, 2023 for U.S. Appl. No. 14/995,114.
PCT International Search Report & Written Opinion dated Sep. 7, 2010 for PCT Patent Application No. PCT/US2010/042483.

* cited by examiner

SIMPLE NONAUTONOMOUS PEERING MEDIA CLONE DETECTION

CROSS-REFERENCE TO RELATED APPLICATIONS

This patent application is a continuation of and claims the benefit of priority to U.S. application Ser. No. 16/989,668, filed on Aug. 10, 2020, which is a continuation of and claims the benefit of priority to U.S. application Ser. No. 12/839,105, filed Jul. 19, 2010, now U.S. Pat. No. 10,740,453, issued Aug. 11, 2020, which claims the benefit of priority to U.S. Provisional Application No. 61/226,421, filed Jul. 17, 2009 the entireties of which are incorporated herein by their reference.

BACKGROUND

The packaging of media content, such as video or audio content, into digital media files has made the exchange of the content very easy and convenient for users. However, users freely exchanging content may violate the content owner's property rights. Content owners also want to restrict the copying of copyright protected content. There are many examples of technologies that make the transfer of copyright protected content very difficult. When physical media is used to store content, permanently or temporarily, for example in electronic purchase, rental and subscription movie service business models, content owners or their licensees use a variety of cryptographic binding methods. These methods typically use a unique media or device identifier or similar player attributes in a cryptographic function to protect the content from being copied or transferred such that it may be said to be bound to the device. Generally, this binding of the content is based upon a particular playback device, which is undesirable for users. Users may want to play their content on a different device than the device that received the content or they may want to transfer it among several personal devices.

One approach involves peering of content, where users transfer data amongst themselves. In order to preserve copyrights and to avoid pirating of the content, a 'non-autonomous' peering system may be employed. In contrast to a typically peering system, where users transfer content freely, the system is 'non-autonomous.' 'Non-autonomous' as used here means that the system includes mechanisms that only allow transfer of the content with the assistance of a centralized authority, while allowing users to transfer media content between their own compliant devices. A peer in this system consists of an end-user owned device acting as the source for a transfer, while in most other systems content resides on a server for download.

Examples of a non-autonomous peering system can be found in U.S. Pat. No. 7,165,050, and US Patent Publication No. 20060064386, both titled, "Media on Demand Via Peering." An example of methods of manufacturing and binding components usable in a non-autonomous peering system can be found in U.S. patent application Ser. No. 12/369,708, "Simple Non-Autonomous Environment, Watermarking And Authentication," filed Feb. 11, 2009. U.S. patent application Ser. Nos. 12/369,708, and 12/713,111 discuss the use of a peering system in conjunction with flash memory devices.

With the increasingly less expensive and wide proliferation of flash memory devices, a very real possibility arises of pirates using flash memory devices to clone valid devices originating from the content providers or legitimate users of a peering system. The pirates can reproduce a huge amount of content on cloned devices with very simple hardware and in a very short period of time.

DETAILED DESCRIPTION OF THE EMBODIMENTS

The below discussion uses several terms that may become confusing. The discussion uses the term 'memory' and memory device' to refer to a non-volatile memory device that contains 'content.' 'Content' includes any type of experiential content and includes, but is not limited to, movies, television shows, recorded performances, video files, audio files, and games. The memory device may include removable memory, such as flash memory drives, so-called 'thumb' drives, memory cards, embedded flash memory including spinning and solid state hard drives, and memory sticks, but no limitation is intended, nor should any be implied by these examples. The memory device will be referred to here as 'content' memory, because it resides separately from on-board memory of a playback device, although it may be internal to the playback device.

The memory device may interface with a 'playback device,' where a playback device is any device having a controller, also referred to as a processor or a system on a chip (SoC), a memory and the ability to interface with the media, whether as embedded media or removable media. Examples include, but are not limited to, televisions, video projectors, digital video recorders, set-top boxes, kiosks, personal computers, and mobile computing devices including smart phones, media players, in-car players, netbooks and tablet computers.

Figure 1:
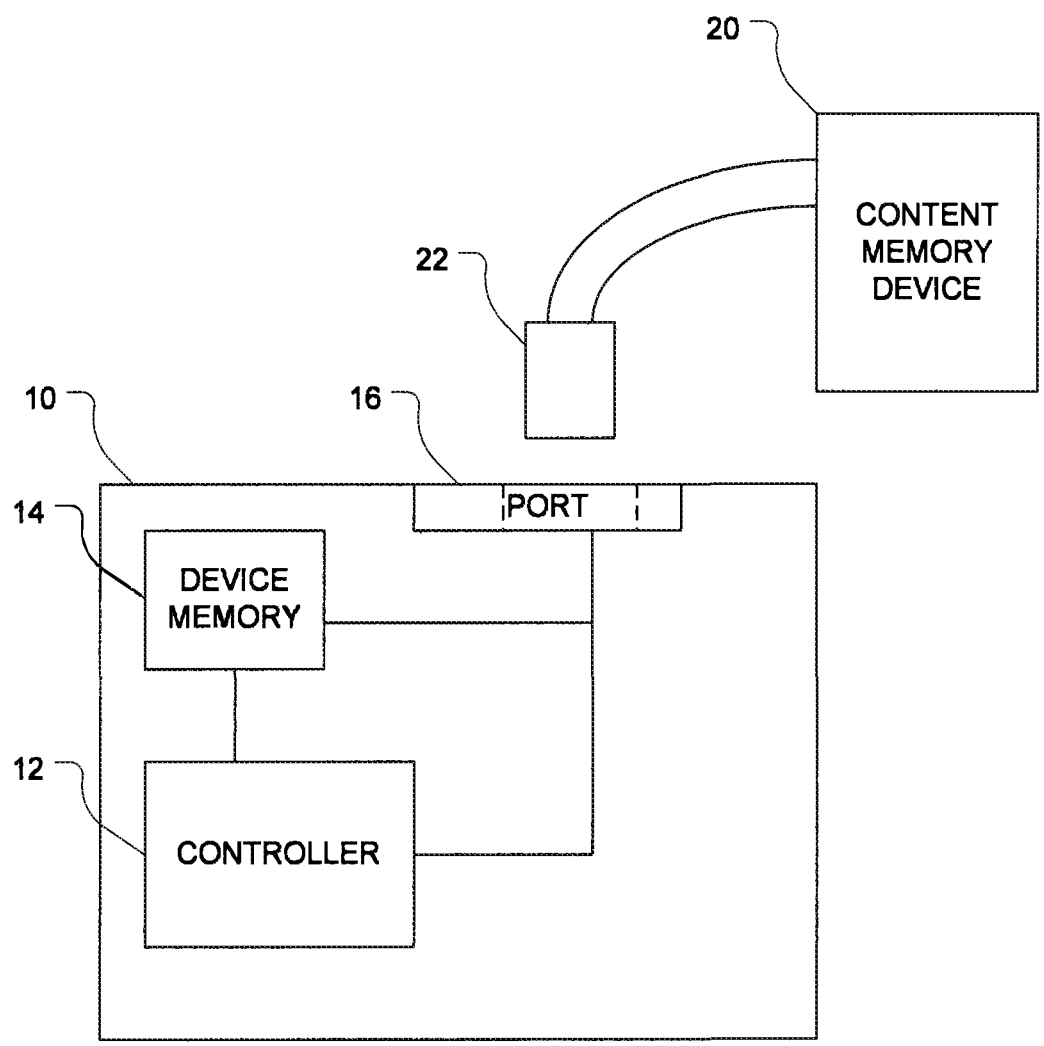
FIG. 1 shows an embodiment of a playback device capable of playing content from a memory device.

FIG. 1 shows an embodiment of a playback device capable of playing content from a memory device. The playback device 10 has a controller 12 that performs the validation of the memory as described below. During this validation process, the controller may access a device memory, 14. The device memory 14 is the 'on-board' memory that exists in the playback device separate from the content memory containing the content. The playback device 10 also has a port 16 to accept the memory device 20. In the case of embedded memory, the port 16 may take the form of a connector to connect between the processor and the embedded memory. The embedded memory will still be referred to here as the 'content memory' to separate it from the device memory 14 used for device operation.

As stated above, the memory device 20 may take one of many different forms, including CompactFlash; MultiMedia Cards (MMC), including Reduced Size—MMC; Secure Digital (SD) cards, including mini-SD and micro-SD; and Memory Sticks. These of course are merely examples of the different memory formats and form factors, which may also be embodied in memory devices such as 20 that connect to the playback device by an external connector 22, such as Universal Serial Bus (USB) connectors, and those that comply with IEEE standard 1394, also referred to as 'firewire.' In the embodiment of embedded memory including hard disks, the content memory device may communicate with the controller using IDE (Integrated Drive Electronics), SATA (Serial Advanced Technology Attachment), SCSI (Serial Computer System Interface), SAS (Serial Attached SCSI) or USB interfaces.

The memory device will typically be a 'flash' memory device, meaning an electrically programmable/erasable non-volatile memory device. These types of devices may be manufactured according to many different metal and semiconductor technologies. Generally, they fall within two different types of operational technologies, those NOR (not OR) flash memory and NAND (not AND) memory devices. Currently, the prevalent type of flash memory is NAND flash memory, but NOR flash memory devices are well within the scope of the embodiments discussed here.

Any type of flash memory device, whether based upon complementary metal-oxide semiconductor technologies, or other types of memory technologies, is within the scope of the embodiments here, as many of them have similar characteristics as to their organization and some of their operations. This includes single level cell (SLC) or multilevel cell (MLC) technologies.

For example, in NAND flash memory, programming the memory changes bits from a logic one to a logic zero. Erasure resets all bits to back to one. The memory is organized into pages and blocks. Erasure happens a block at a time, with block sizes typically being 64, 128 or 256 KB. NAND flash devices may also include bad block management, a process by which bad blocks are identified and mapped either at runtime or at manufacture. Many devices also now include wear leveling, where the writing of data is rotated among blocks to prolong the life of the memory cells that will eventually degrade over repeated write/read cycles.

In NAND flash devices, each block consists of a number of pages, each page may have a typical size of 512, 2,048, or 4,096 bytes in size plus a few bytes to store an error correcting code (ECC) checksum and other metadata necessary for the operation of the memory array. Reading and programming of these devices is typically done on a page basis. Erasure is done on a block basis. NAND devices typically also have bad block management by the device driver software, or by a separate controller chip. SD cards, for example, include controller circuitry to perform bad block management and wear leveling. When a logical block is accessed by high-level software, it is mapped to a physical block by the device driver or controller. A number of blocks on the flash chip may be set aside for storing mapping tables to deal with bad blocks, or the system may simply check each block at power-up to create a bad block map. The overall memory capacity gradually shrinks as more blocks are marked as bad. These set aside blocks for mapping tables or the memory region in which the power-up (runtime) maps are stored constitute the defined region.

Most NAND devices are shipped from the factory with some bad blocks which are typically identified and marked according to a specified bad block marking strategy. By allowing some bad blocks, the manufacturers achieve far higher yields than would be possible if all blocks had to be verified good. This significantly reduces NAND flash costs and only slightly decreases the storage capacity of the parts.

While the embodiments herein may be applied to either NAND or NOR flash memories, no such limitation is intended nor should it be implied. The embodiments here could be applied to any type of memory device that has bad block management and the ability to use bad block maps and known data patterns to determine an expected data pattern when validating the memory device. Memory devices include hard disk drives, both 'traditional' spinning disks with readers and solid state hard drives.

Figure 2:
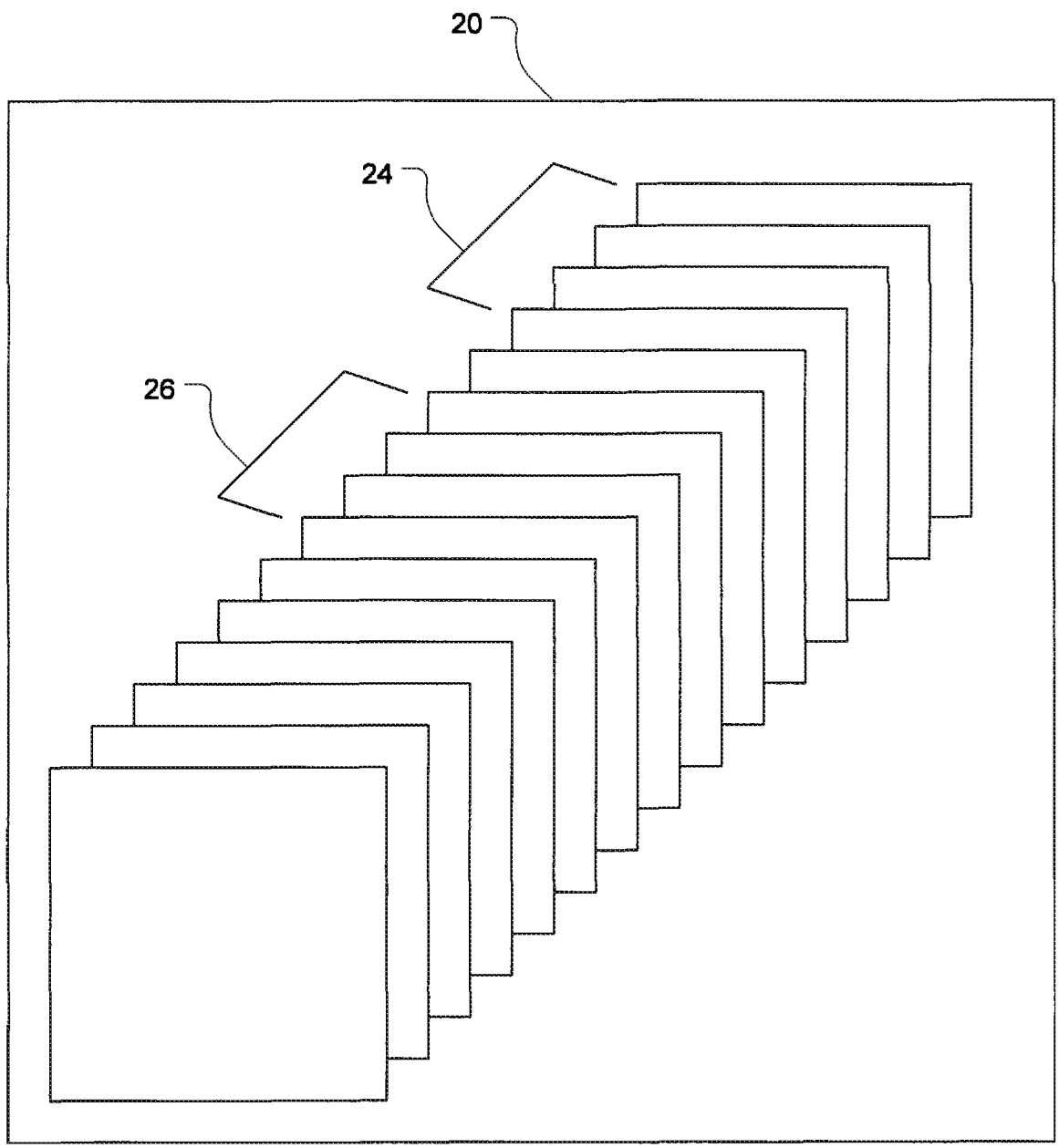
FIG. 2 shows an embodiment of a flash memory device having a predefined region.

FIG. 2 shows an example of a memory device 20. As described above, the memory device 20 may be organized as pages and blocks, where a block is made up of a number of pages. Alternatively, the memory may be organized in sectors. In either case, the memory has 'regions,' meaning some predetermined subset of memory cells that is smaller than the overall size of the memory device.

Within the memory array, the manufacturer or content provider that has provided the content stored by the memory device has defined a region 24. The region may consist of some set of blocks, pages, or sectors. The region has a known defect map, either generated by a SNAP server before content is delivered to the media, or determined at manufacture of the memory device. If the defect map has been determined at manufacture of the memory device, the memory device may store the defect map in a second region 26 of the memory device.

By using the defect maps of the individual memory devices, the content provider will have a characteristic of the memory array usable to validate the memory device and therefore unlock the content. Validation of the memory device allows the content providers to ensure that only authorized memory devices carry their content, as opposed to devices to which their content has been copied in violation of their copyrights. This discussion may refer to these devices as 'cloned' devices.

In order to replicate the content and still allow the memory device to appear valid, the pirates would have to determine the exact location of the defined region, have access to a known data pattern used in validation and the defect map of the memory device. The computing power to determine this will typically prohibit a pirate from having the capability of producing memory devices that validate in the playback devices and allow playing of the content.

Figure 3:
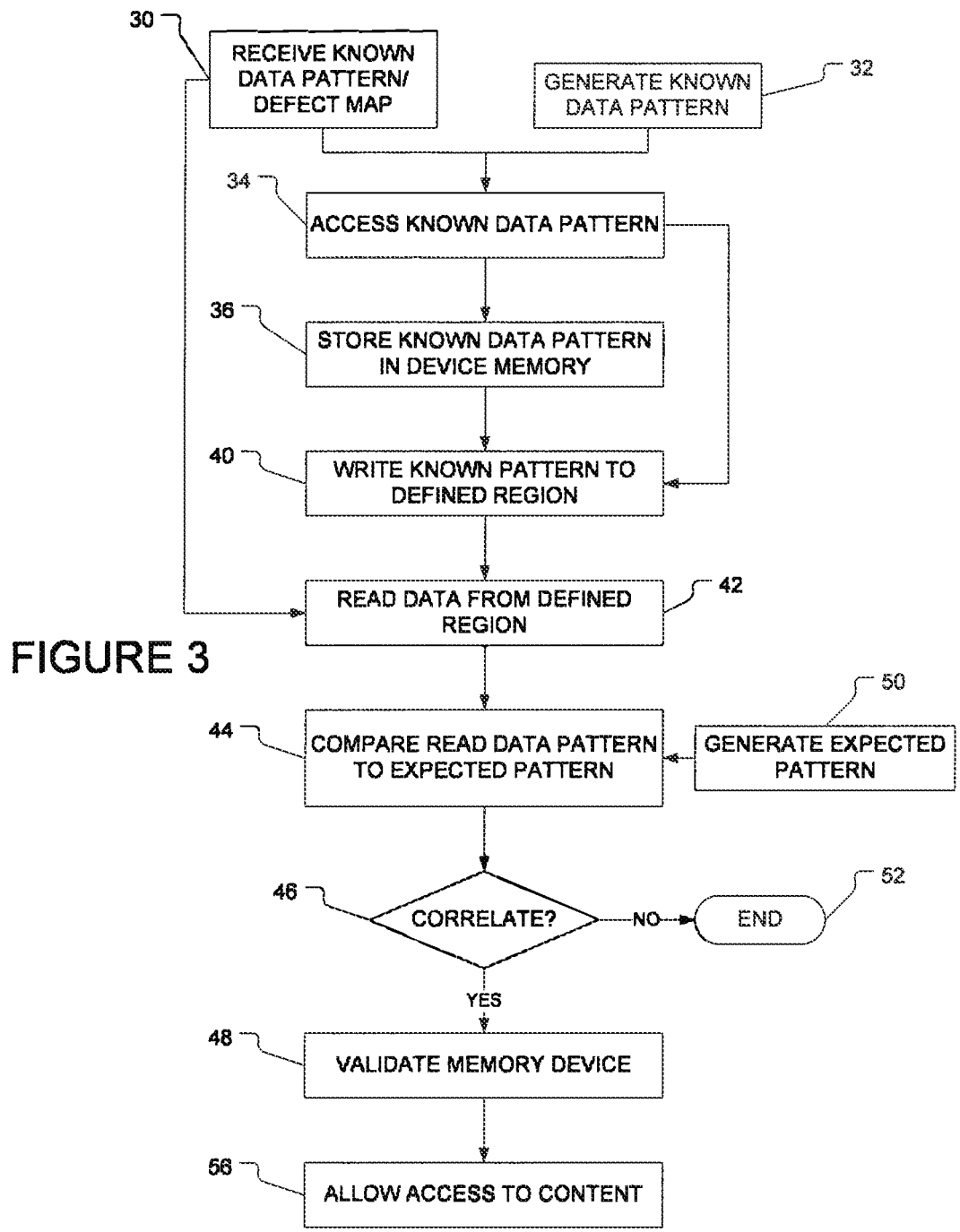
FIG. 3 shows an embodiment of a method of validating a flash memory device.

FIG. 3 shows one embodiment of a method to validate a memory device in a playback device. As mentioned above, the process uses known random data patterns to validate the memory device. The playback device may generate the known data pattern each time for validation, or generate it once and store it in the playback device memory, at 32. Alternatively, the content providers or memory device manufacturers may provide the known data pattern and/or the defect map, in which case the playback device receives it at 30, either one time and then stored or while connected to a content or validation server.

In the case where the known data pattern or defect map is provided by the manufacturer or content provider, the defect map will typically be signed to allow authentication/validation. For example, the manufacturer may provide the defect map in the metadata that accompanies the memory device and may have already written the known data pattern to the defined region in the memory.

The playback device would then access the known data pattern at 34, where accessing the known data pattern may involve retrieving it from the playback device memory, generating the known data pattern or receiving it in real-time. As mentioned above the known data pattern may be stored at 36, but this is optional.

Once the device has the known data pattern, it writes the known data pattern to the defined region in the memory device at 40. The playback device then reads data from the defined region at 42. The data read from the defined region should correlate to the known data pattern altered in a manner determined by the defect map. For example, in the known data pattern, the playback device writes a 1 to the memory cell corresponding to bit 3. However, because of the defect map, the playback device 'knows' that the cell storing bit 3 has a defect. Therefore, the expected data pattern will return the known data pattern, except that bit 3 will be a O instead of a 1. This simplified example demonstrates how the defect map produces a unique data pattern upon reading from the defined region. The discussion will refer to the read data pattern altered by the defect map as the 'expected data pattern', generated by the playback device at 50.

In the embodiment where the known data pattern and/or defect map have been provided by the manufacturer, the process may skip from the receiving of the known data pattern and defect map to the reading of the data from the defined region at 42. This process may occur in several ways. For example, the playback device may read the data from the defined region using the error correction code to determine the known data pattern. Then the playback device may read the data from the defined region without using the error correction code. These patterns would then be used in the following comparison.

One should note that the expected data pattern may not actually reside in the playback device as a stored entity. The playback device may read the data back from the defined region and compare it to the known data pattern, then check the read data pattern against the defect map. A multitude of ways exists to make the comparison between the read data pattern and the expected data pattern at 44, all of which are within the scope of the embodiments here.

At 46, the playback device determines if the comparison result of the two patterns meets some correlation criteria, as they may not match exactly. For example, the defect in bit 3 may result in the data bit having the correct value when read back or having the opposite value.

Note that the memory cells can be modeled by independent random variables, each with a certain probability of being defective (different cells having different probabilities). This is a well-studied problem in statistical analysis, and a standard correlation function used in this case is the Chi Square test. However, other correlation functions, including ad hoc functions, are within the scope of this invention. The process accounts for these kinds of unknown results by providing some correlation measure that has a high enough value that the memory device validates even though the patterns do not match exactly.

Indeed, in some cases, the patterns would actually be expected to not match exactly. In NAND flash devices, some devices may have intermittent defects, meaning that from read to read, a bit with an intermittent error may change state. This would result in the read data pattern to vary slightly from the expected data pattern. For example, a defect map may identify bit 3 of a particular portion of the memory to have an intermittent data error. In the known data pattern, bit 3 may be written as a data 1. The expected data pattern may expect a O at bit 3 because it has a defect. However, because it is an intermittent defect, bit 3 may return a O the first read and a 1 the second read.

This anomaly can be accounted for using a correlation measure such that the read data pattern correlation would vary from read to read. If it did not vary from read to read, where the read data pattern is the exact same each read, it may actually indicate that it is a cloned device. It would take considerably more logic circuitry and computing power to mimic the intermittent data errors.

Returning to FIG. 3, if the two patterns do not match within the correlation criteria, the process ends at 52. Ending the process may include application of some sort of anti-piracy measure such as memory device erasure, generation of a piracy report sent back to an on-line reporting house, etc. If the two patterns match within the correlation measure at 46, the playback device validates the memory device. Once validated, the playback device then allows access to the content on the memory device to allow the user to experience the content.

In this manner, content providers use an inherent characteristic of the memory device to validate the memory devices. Pirates would have to find memory devices that have the same defect maps or divine some way of spoofing a memory device defect map, get access to the known data pattern, and know the exact location of the defined region to replicate pirated content across cloned devices. The computing power this requires would prohibit the vast majority of pirating efforts.

Although there has been described to this point a particular embodiment for a method and apparatus for validating memory devices containing content, it is not intended that such specific references be considered as limitations upon the scope of this invention except in-so-far as set forth in the following claims.

What is claimed is:

1. A system for validating media content, the system comprising a content memory device that is configured to:
   read a unique data pattern written to the content memory device of a validation entity by one of a manufacturer or a content provider, the unique data pattern being altered by known content memory device defects in the content memory device, the known content memory device defects being identified by a defect map that is stored by the validation entity, wherein the unique data pattern is stored in a memory of the content memory device before the content memory device is coupled to a playback device;
   transmit the unique data pattern from the content memory device to the playback device such that the playback device is configured to validate the content memory device based on the unique data pattern and the defect map; and
   transmit content from the content memory device and to the playback device, responsive to a validation of the content memory device performed using the transmitted unique data pattern.

2. The system of claim 1, wherein the playback device is further configured to generate the unique data pattern and write the unique data pattern to the content memory device.

3. The system of claim 1, wherein the playback device is configured to validate the content memory device by altering the unique data pattern using the defect map to produce an expected data pattern and to compare the expected data pattern with the unique data pattern and wherein the playback device only allows access to content stored in the content memory device if the content memory device is validated.

4. The system of claim 1, wherein the playback device is further configured to read the unique data pattern at least twice to detect an expected intermittent defect.

5. The system of claim 1, wherein the playback device is further configured to validate the content memory device based on the unique data pattern and the defect map by comparing the unique data pattern to an expected data pattern, wherein the playback device is further configured to compute the expected data pattern according to the defect map and the unique data pattern.

6. The system of claim 1, wherein the playback device is further configured to validate the content memory device based on the unique data pattern and the defect map by comparing the unique data pattern to the known content memory device defects and comparing the unique data pattern with the defect map.

7. The system of claim 1, wherein the playback device is configured to validate the content memory device based on the unique data pattern and the defect map-by error correcting the unique data pattern to regenerate the unique data pattern, comparing the unique data pattern to the regenerated unique data pattern to identify the known content memory device defects, and comparing the identified defects with the defect map.

8. The system of claim 1, wherein the content memory device includes cells, each having a probability of defect; and the playback device is configured to validate the content memory device upon the unique data pattern, the defect map, and the probability of a respective defect in each of the cells.

9. The system of claim 8, wherein the playback device is configured to validate the content memory device by matching the unique data pattern and the known content memory device defects according to the defect map and a correlation measure determined from the probability of a defect in each of the cells.

10. The system of claim 1, wherein the known content memory device defects are identified by post-manufacturing testing of the content memory device.

11. A method for securing media content, the method comprising:
reading a unique data pattern written to a content memory device of a validation entity by one of a manufacturer or a content provider, the unique data pattern being altered by known content memory device defects in the content memory device, the known content memory device defects being identified by a defect map that is stored by the validation entity, wherein the unique data pattern is stored in a memory of the content memory device before the content memory device is coupled to a playback device;
transmitting the unique data pattern from the content memory device to the playback device such that the playback device is configured to validate the content memory device based on the unique data pattern and the defect map; and
transmitting content from the content memory device and to the playback device, responsive to a validation of the content memory device performed using the transmitted unique data pattern.

12. The method of claim 11, wherein the playback device is further configured to generate the unique data pattern and write the unique data pattern to the content memory device.

13. The method of claim 11, wherein the playback device is configured to validate the content memory device by altering the unique data pattern using the defect map to produce an expected data pattern and to compare the expected data pattern with the unique data pattern and wherein the playback device only allows access to content stored in the content memory device if the content memory device is validated.

14. The method of claim 11, wherein the content memory device includes cells, each having a probability of defect;
and the playback device is configured to validate the content memory device upon the unique data pattern, the defect map, and the probability of a defect in each of the cells.

15. The method of claim 11, wherein the known content memory device defects are identified by post-manufacturing testing of the content memory device.

16. A non-transitory computer readable medium having program instructions stored thereon, wherein when executed by a processor, cause the processor to perform operations comprising:
reading a unique data pattern written to a content memory device of a validation entity by one of a manufacturer or a content provider, the unique data pattern being altered by known content memory device defects in the content memory device, the known content memory device defects being identified by a defect map that is stored by the validation entity, wherein the unique data pattern is stored in a memory of the content memory device before the content memory device is coupled to a playback device;
transmitting the unique data pattern from the content memory device to the playback device such that the playback device is configured to validate the content memory device based on the unique data pattern and the defect map; and
transmitting content from the content memory device and to the playback device, responsive to a validation of the content memory device performed using the transmitted unique data pattern.

17. The non-transitory computer readable medium of claim 16, wherein the content memory device includes cells, each having a probability of defect; and the playback device is configured to validate the content memory device based on the unique data pattern, the defect map, and the probability of a defect in each of the cells.

18. The non-transitory computer readable medium of claim 16, wherein the known content memory device defects are identified by post-manufacturing testing of the content memory device.

* * * * *

UNITED STATES PATENT AND TRADEMARK OFFICE
CERTIFICATE OF CORRECTION

PATENT NO. : 12,481,729 B2  
APPLICATION NO. : 18/394034  
DATED : November 25, 2025  
INVENTOR(S) : Aaron Marking, Kenneth Goeller and Jeffrey Bruce Lotspiech Page 1 of 1

It is certified that error appears in the above-identified patent and that said Letters Patent is hereby corrected as shown below:

In the Claims

In Column 7, Line 6, delete "map-by" and insert --map by--

Signed and Sealed this  
Thirteenth Day of January, 2026

John A. Squires  
*Director of the United States Patent and Trademark Office*